US012565267B2

(12) United States Patent
Dai et al.

(10) Patent No.: US 12,565,267 B2
(45) Date of Patent: Mar. 3, 2026

(54) VEHICLE BODY FRAME AND VEHICLE

(71) Applicant: XIAOMI EV TECHNOLOGY CO., LTD., Beijing (CN)

(72) Inventors: Tailiang Dai, Beijing (CN); Rong Zeng, Beijing (CN); Tao Ma, Beijing (CN); Zhibing Han, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 385 days.

(21) Appl. No.: 18/209,354

(22) Filed: Jun. 13, 2023

(65) Prior Publication Data

US 2024/0227939 A1　　Jul. 11, 2024

(30) Foreign Application Priority Data

Jan. 6, 2023　　(CN) ......................... 202310018505.X

(51) Int. Cl.
B62D 21/15　　(2006.01)
B62D 21/11　　(2006.01)
B62D 25/04　　(2006.01)
B62D 25/08　　(2006.01)

(52) U.S. Cl.
CPC ............ B62D 21/152 (2013.01); B62D 21/11 (2013.01); B62D 25/04 (2013.01); B62D 25/08 (2013.01)

(58) Field of Classification Search
CPC ...... B62D 21/152; B62D 21/11; B62D 25/08; B62D 25/082; B62D 25/088; B62D 25/085; B62D 23/00
USPC .......... 296/203.01, 2, 187.09, 1, 29, 30, 198
See application file for complete search history.

(56) References Cited

U.S. PATENT DOCUMENTS 5,411,311 A * 5/1995 Shimmell ............ B62D 25/082
280/798

FOREIGN PATENT DOCUMENTS

| CN | 100503339 C | * | 6/2009 | .......... B62D 25/082 |
| CN | 111376980 B | | 12/2021 | |
| DE | 102017007553 B4 | * | 3/2022 | .......... B62D 25/082 |
| WO | WO 2022119176 A1 | | 6/2022 | |

OTHER PUBLICATIONS

CN10050339 Text (Year: 2022).*
DE102017007553 Text (Year: 2009).*
European Patent Application No. 23182275.0, Search and Opinion dated Feb. 5, 2024, 7 pages.

* cited by examiner

*Primary Examiner* — Dennis H Pedder
(74) *Attorney, Agent, or Firm* — Cozen O'Connor

(57) ABSTRACT

A vehicle body frame includes a front bumper beam assembly, first and second frame assemblies, and a front compartment triangular beam. The front bumper beam assembly extends along a width direction of a vehicle body. The first and second frame assemblies are coupled to the front bumper beam assembly, and spaced apart in the width direction of the vehicle body. Each of the first and second frame assemblies includes a front longitudinal beam, an upper beam and a front damper tower. The front longitudinal beam is coupled to the front bumper beam assembly, the upper side beam is coupled to the front longitudinal beam. The front damper tower is coupled between the upper side beam and the front longitudinal beam. The front compartment triangular beam is coupled between the front damper tower of the first frame assembly and the front damper tower of the second frame assembly.

15 Claims, 7 Drawing Sheets

VEHICLE BODY FRAME AND VEHICLE

CROSS-REFERENCE TO RELATED APPLICATIONS

The present application claims benefit of priority to Chinese Application No. 202310018505.X, filed on Jan. 6, 2023, the contents of which are incorporated herein by reference in their entireties for all purposes.

BACKGROUND

Twenty five percent (25%) frontal small offset crash is one of the most critical parameters for vehicle safety assessment in frontal crash. Because of its small overlap and small stressed area, it may cause greater damage to passengers. Therefore, it is required that the body structure can minimize the intrusion of crash into the passenger compartment of the vehicle and ensure the safety of the passengers.

SUMMARY

The present disclosure relates to a field of vehicles, and particularly it relates to a vehicle body frame and a vehicle.

The vehicle body frame of embodiments of the present disclosure includes a front bumper beam assembly, a first frame assembly and a second frame assembly, and front compartment triangular beam. The front bumper beam assembly extends along a width direction of a vehicle body. The first frame assembly and a second frame assembly are separately coupled to the front bumper beam assembly and spaced apart in the width direction of the vehicle body. Each of the first frame assembly and the second frame assembly includes a front longitudinal beam, an upper side beam and a front damper tower. The front longitudinal beam is coupled to the front bumper beam assembly to form a first longitudinal force transmission path, the upper side beam is coupled to the front longitudinal beam, and the front damper tower has a first end coupled to the upper side beam and a second end coupled to the front longitudinal beam. The front compartment triangular beam has a first end coupled to the front damper tower of the first frame assembly, and a second end coupled to the front damper tower of the second frame assembly.

The vehicle according to some embodiments of the present disclosure includes a vehicle body frame. The vehicle body frame includes a front bumper beam assembly, a first frame assembly and a second frame assembly, and front compartment triangular beam. The front bumper beam assembly extends along a width direction of a vehicle body. The first frame assembly and a second frame assembly are separately coupled to the front bumper beam assembly and spaced apart in the width direction of the vehicle body. Each of the first frame assembly and the second frame assembly includes a front longitudinal beam, an upper side beam and a front damper tower. The front longitudinal beam is coupled to the front bumper beam assembly to form a first longitudinal force transmission path, the upper side beam is coupled to the front longitudinal beam, and the front damper tower has a first end coupled to the upper side beam and a second end coupled to the front longitudinal beam. The front compartment triangular beam has a first end coupled to the front damper tower of the first frame assembly, and a second end coupled to the front damper tower of the second frame assembly

Figure 1:
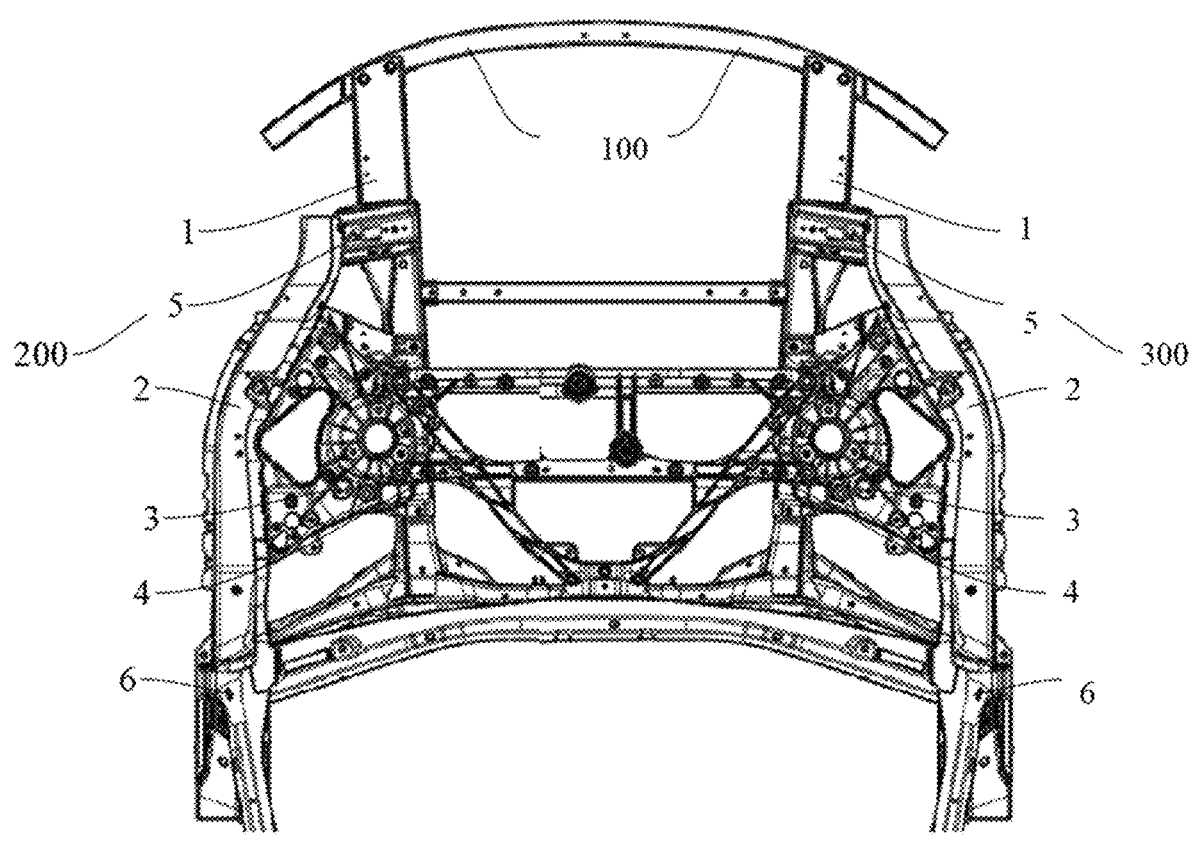
FIG. 1 is a schematic diagram of a vehicle body frame according to an embodiment of the present disclosure.

REFERENCE NUMERALS front crash beam assembly 100, first frame assembly 200, front longitudinal beam 1,
upper side beam 2, upper side beam inner plate 21, upper side beam outer plate 22,
front damper tower 3, coupling edge 31, reinforcing rib 32,
front compartment triangular beam 4, first coupling part 41, second coupling part 42,
coupling beam 5, first plate body 51, second plate body 52, A-pillar assembly 6, first energy-absorbing deformation area 7, second energy-absorbing deformation area 8.

DETAILED DESCRIPTION

Hereinafter, embodiments of the present disclosure will be described in detail, and examples of the embodiments are illustrated in the accompanying drawings. The embodiments described below with reference to the accompanying drawings are exemplary and are intended to explain the present disclosure, and should not be construed as limiting the present disclosure.

In the related art, the structure of a reinforcing beam and a reinforcing plate is added to improve the small offset impact performance of the vehicle body. However, adding the reinforcing beam and reinforcing plate will increase the weight of the vehicle body frame.

The present disclosure aims to solve one of the technical problems in the related art at least to some extent. Therefore, embodiments of the present disclosure propose a vehicle body frame, which can optimize a force transmission path of the vehicle body frame and improve crash performance of the vehicle body frame.

Embodiments of the disclosure also provide a vehicle.

As illustrated in FIGS. 1 to 7, a vehicle body frame of embodiments of the present disclosure includes a front bumper beam assembly 100, a first frame assembly 200 and a second frame assembly 300. The front bumper beam assembly 100 extends in a width direction of a vehicle body, the first frame assembly 200 and the second frame assembly 300 are separately coupled to the front bumper beam assembly 100, and the first frame assembly 200 and the second frame assembly 300 are spaced apart in the width direction of the vehicle body. Each of the first frame assembly 200 and the second frame assembly 300 includes a front longitudinal beam 1, an upper side beam 2, a front damper tower 3 and a front compartment triangular beam 4. The front longitudinal beam 1 is coupled to the front bumper beam assembly 100 to form a first longitudinal force transmission path, the upper side beam 2 is coupled to the front longitudinal beam 1, the front damper tower 3 has a first end coupled to the upper side beam 2 and a second end coupled to the front longitudinal beam 1. The front compartment triangular beam 4 has a first end coupled to the front damping tower 3 of the first frame assembly 200 and a second end coupled to the front damping tower 3 of the second frame assembly 300.

Specifically, as illustrated in FIG. 1, the bumper beam assembly 100 extends in a left-right direction, the first frame assembly 200 and the second frame assembly 300 are symmetrically arranged in the left-right direction, and a joint between the front bumper beam assembly 100 and the first frame assembly 200 is located at a right side of a left end face of the front bumper beam assembly 100, and a joint between the bumper beam assembly 100 and the second frame assembly 300 is located at a left side of a right end face of the front bumper beam assembly 100.

The front longitudinal beam 1 extends in a front-rear direction, a front side of the front longitudinal beam 1 is coupled to the front bumper beam assembly 100, a left side of the front damper tower 3 is coupled to the upper side beam 2, a right side of the front damper tower 3 is coupled to the front longitudinal beam 1, and a front side of the front damper tower 3 is coupled to the front longitudinal beam 1.

In the vehicle body frame of embodiments of the present disclosure, after the front bumper beam assembly 100 is hit, an impact force is transmitted to the front longitudinal beam 1 through the front bumper beam assembly 100 to form a first longitudinal force transmission path; when the impact force acts on the upper side beam 2, the impact force can also be transmitted to the front longitudinal beam 1 through the upper side beam 2 as a front end of the upper side beam 2 is coupled to the front longitudinal beam 1, and this part of the impact force overlaps with the force on the first longitudinal force transmission path, leading to counteraction between forces, which enhances crash energy absorption, optimizes force transmission path of the vehicle body frame and improves the crash performance of the vehicle body frame. The front damper tower 3 is arranged between the upper side beam 2 and the front longitudinal beam 1, and the impact force on the upper side beam 2 is transmitted to the front longitudinal beam 1 through the front damper tower 3, so as to further overlap the force on the first longitudinal force transmission path, leading to counteraction between the forces.

In some embodiments, the upper side beam 2 includes an upper side beam inner plate 21 and an upper side beam outer plate 22, and the upper side beam inner plate 21 and the upper side beam outer plate 22 are fitted with each other. The vehicle body frame also includes a coupling beam 5, the coupling beam 5 has a first end coupled to the upper side beam inner plate 21 and a second end coupled to the front longitudinal beam 1 to form a first transverse force transmission path.

Figure 2:
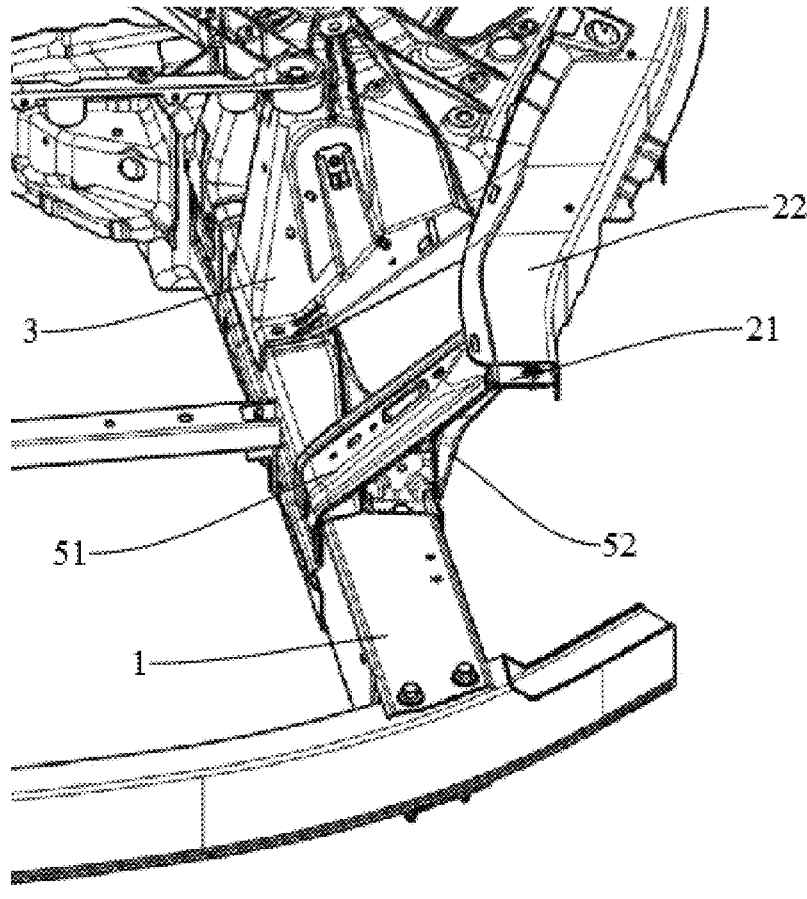
FIG. 2 is a schematic diagram of a vehicle body frame according to an embodiment of the present disclosure from another angle.

Specifically, as illustrated in FIG. 2, the upper side beam 2 extends in the front-rear direction, and the upper side beam inner plate 21 is located below the upper beam outer plate 22, and the upper side beam inner plate 21 and the upper side beam outer plate 22 are interlocked with each other to form a cavity with a quadrangular cross section, which can improve the structural strength and energy absorption effect of the upper side beam 2.

An upper end of the coupling beam 5 is coupled to the upper side beam inner plate 21, and a lower end of the coupling beam 5 is coupled to the front longitudinal beam 1. The upper side beam 2 and the front longitudinal beam 1 are coupled together by the coupling beam 5 to form the first transverse force transmission path, and the force transmitted on the first transverse force transmission path and the force transmitted on the first longitudinal force transmission path overlap at a joint of the coupling beam 5 and the front longitudinal beam 1, so as to counteract part of the impact force and further improve the impact resistance of the whole vehicle body frame.

For example, each of the upper side beam inner plate 21 and the upper side beam outer plate 22 is cast from ultra-high strength steel, and the upper side beam outer plate 22 is fixedly coupled to two seam edges of the upper side beam inner plate 21 by electric welding to form the upper side beam 2 with a cavity, and the cavity of the upper side beam 2 continuously expands from a front end to a rear end.

In some embodiments, the coupling beam 5 includes a first plate body 51 and a second plate body 52, and each of the first plate body 51 and the second plate body 52 has an upper end coupled to the upper side beam inner plate 21.

Specifically, as illustrated in FIG. 2, the first plate body 51 is located above the second plate body 52. A lower end of the first plate body 51 is coupled to the front longitudinal beam 1, the upper end of the first plate body 51 is coupled to a left side face of the upper side beam inner plate 21, and the upper end of the second plate body 52 is coupled to a lower end face of the upper side beam 2, and a distance between the first plate body 51 and the second plate body 52 is gradually increased from top to bottom, thus the maximum area contact is formed among the coupling beam 5, the upper side beam 2 and the front longitudinal beam 1, so that the impact force acting on the upper side beam 2 is more fully transmitted to the front longitudinal beam 1 through the coupling beam 5, and the impact resistance of the vehicle body frame is improved.

In some embodiments, the front longitudinal beam 1 has a first side and a second side oppositely arranged in the width direction of the vehicle body, the lower end of the first plate body 51 is coupled to the first side, and the lower end of the second plate body 52 is coupled to the second side.

Specifically, as illustrated in FIG. 2, a lower end face of the first plate body 51 is coupled to a left end face of the front longitudinal beam 1, and the second plate body 52 is coupled to a right end face of the front longitudinal beam 1, so that the maximum area contact is formed among the coupling beam 5, the upper side beam 2 and the front longitudinal beam 1, so that the impact force acting on the upper side beam 2 is more fully transmitted to the front longitudinal beam 1 through the coupling beam 5, and the impact resistance of the vehicle body frame is improved.

In some embodiments, the front damper tower 3 includes a coupling edge 31, the coupling edge 31 is arranged obliquely from bottom to top, and the coupling edge 31 has a first end coupled to the upper side beam 2 and a second end coupled to the front longitudinal beam 1 to form a second transverse force transmission path.

Figure 3:
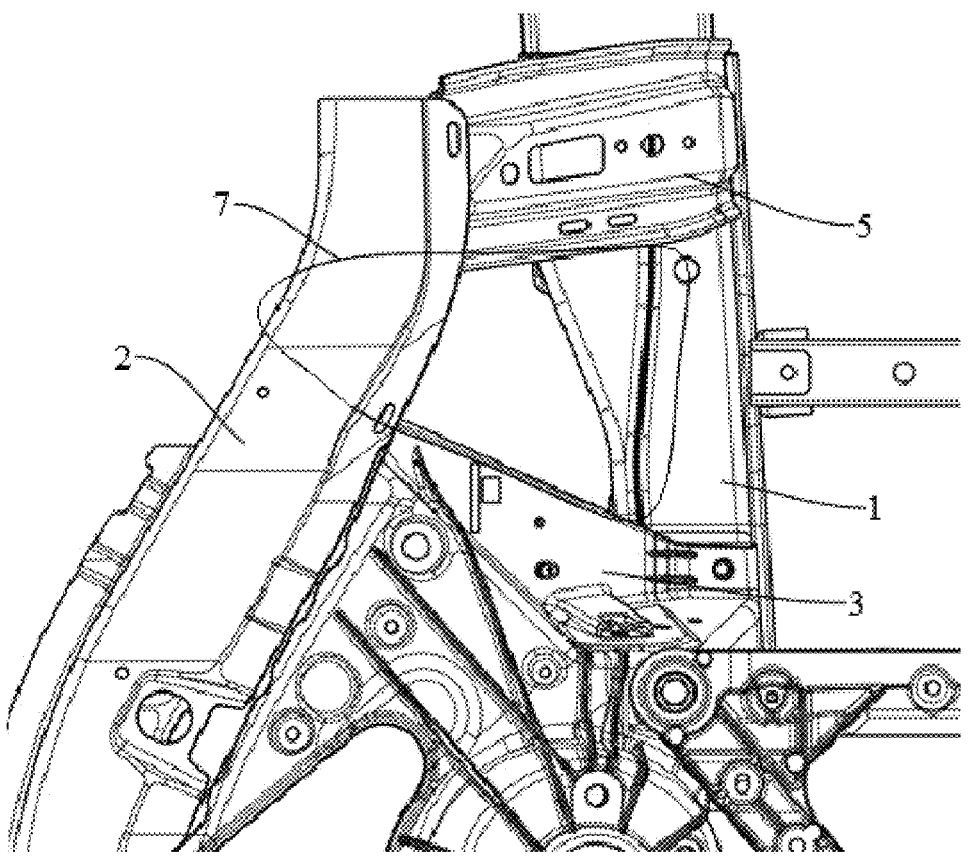
FIG. 3 is a schematic diagram of an energy-absorbing deformation area of a vehicle body frame according to an embodiment of the present disclosure.

Specifically, as illustrated in FIG. 3, a left end of the front damper tower 3 is coupled to the upper side beam 2, and a right end of the front damper tower 3 is coupled to an upper end face of the front longitudinal beam 1. The front damper tower 3 and the coupling beam 5 are spaced apart in the front-rear direction, and a first energy-absorbing deformation area is enclosed among the front damper tower 3, the upper side beam 2, the front longitudinal beam 1 and the coupling beam 5, thus improving the energy-absorbing performance of the vehicle body frame.

Figure 4:
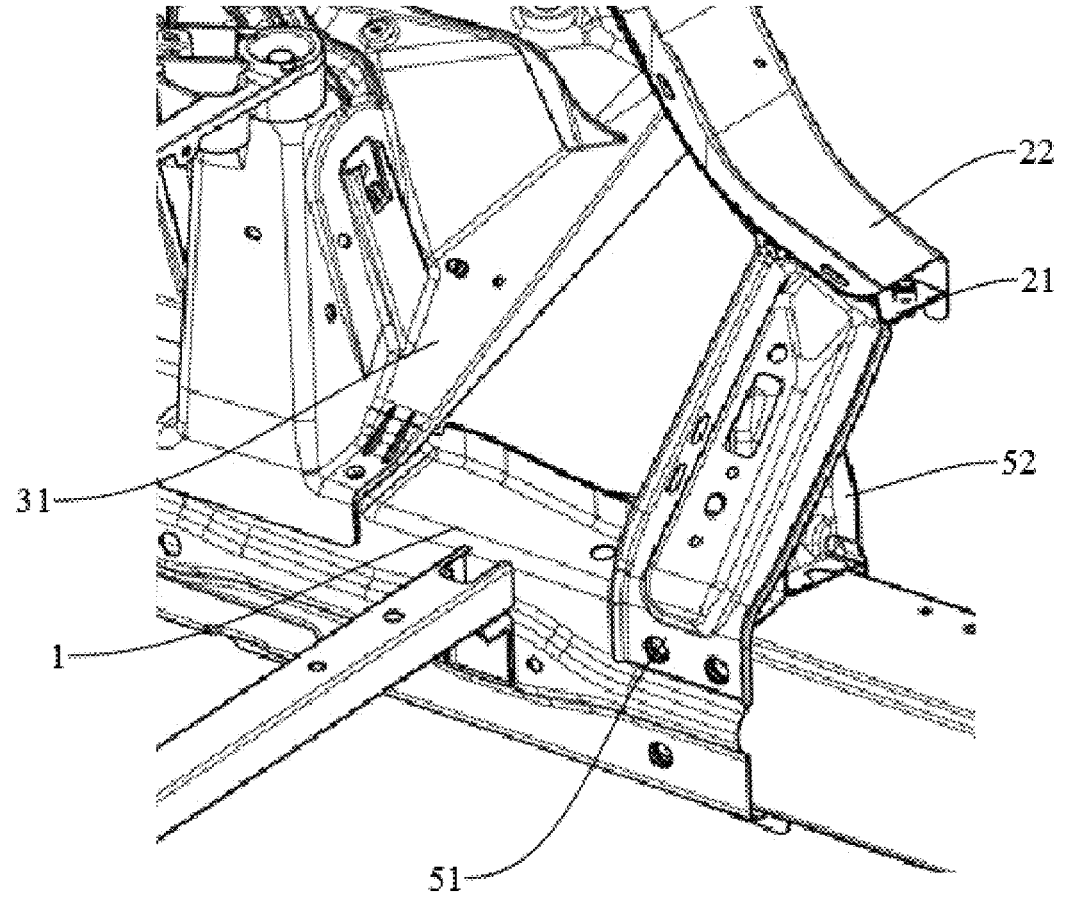
FIG. 4 is a schematic diagram of a vehicle body frame according to an embodiment of the present disclosure from still another angle.
Figure 5:
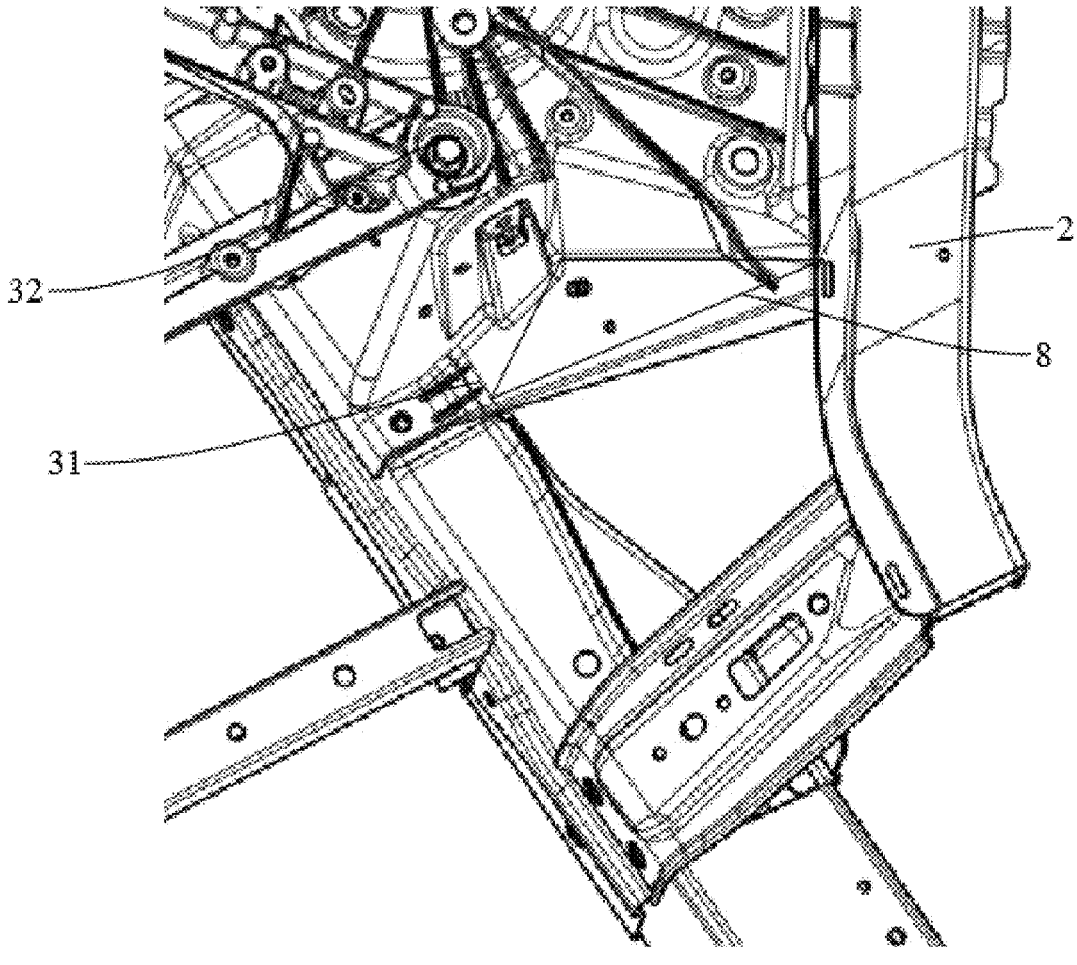
FIG. 5 is a schematic diagram of another energy-absorbing deformation area of a vehicle body frame according to an embodiment of the present disclosure.

As illustrated in FIGS. 4 and 5, the coupling edge 31 is located at a front side of the front damper tower 3, and extends obliquely from top to bottom and from left to right. An upper end of the coupling edge 31 is coupled to the upper side beam 2, and a lower end of the coupling edge 31 is coupled to the upper end face of the front longitudinal beam 1, and the outer contour of a longitudinal section of the coupling edge 31 is triangular. The coupling edge 31 can form a second transverse force transmission path, and also form a second energy-absorbing deformation area 8, which improves the energy-absorbing performance of the vehicle body frame.

It should be noted that after the impact energy on the upper side beam 2 is transmitted to the joint between the coupling edge 31 and the front longitudinal beam 1 through the second transverse force transmission path, the impact energy overlaps and counteract the impact energy on the first longitudinal force transmission path, thus further reducing the impact energy invading a driver compartment and improving the impact resistance of the vehicle body frame.

In some embodiments, the front damper tower 3 is provided with a plurality of reinforcing ribs 32, and the plurality of reinforcing ribs 32 is spaced apart from each other on the front damper tower 3.

Figure 6:
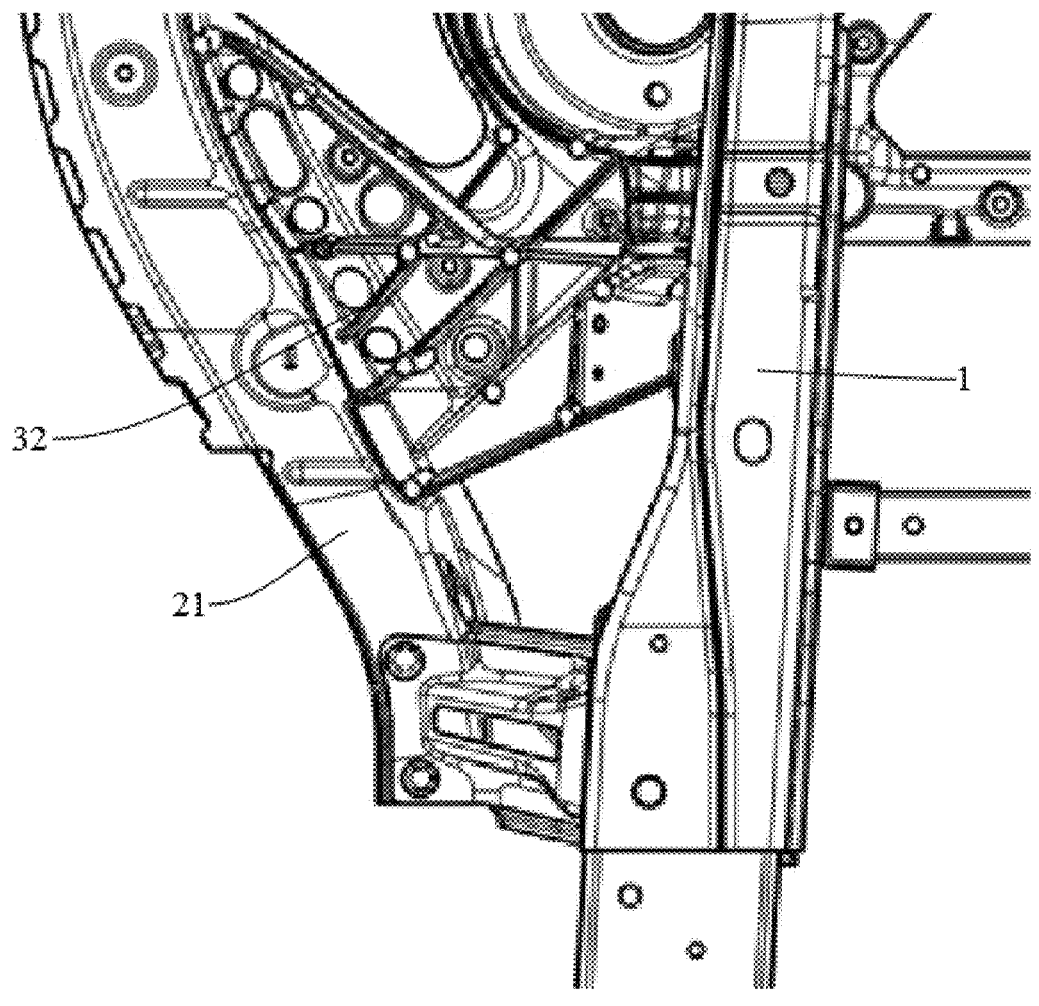
FIG. 6 is a bottom view of a vehicle body frame according to an embodiment of the present disclosure.

Specifically, as illustrated in FIGS. 5 and 6, the front damper tower 3 is provided with a plurality of reinforcing ribs 32 extending in the left-right direction, and the reinforcing ribs 32 are spaced apart from each other on the front damper tower 3. By arranging the reinforcing ribs 32 and extending the reinforcing ribs 32 in the left-right direction, the impact resistance of the front damper tower 3 can be improved, so as to better complete the transmission of impact force.

In some embodiments, the front compartment triangular beam 4 includes a first coupling part 41 and a second coupling part 42, and each of the first coupling part 41 and the second coupling part 42 is coupled to the front damper tower 3. The first coupling part 41 extends along the width direction of the vehicle body, and is configured to couple the front damper tower 3 of the first frame assembly 200 to the front damper tower 3 of the second frame assembly 300 to form a third transverse force transmission path, and the second coupling part 42 extends along the length direction of the vehicle body. A side of the second coupling part 42 facing away from the front damper tower 3 is adapted to be coupled to a front panel assembly to form a second longitudinal force transmission path.

Figure 7:
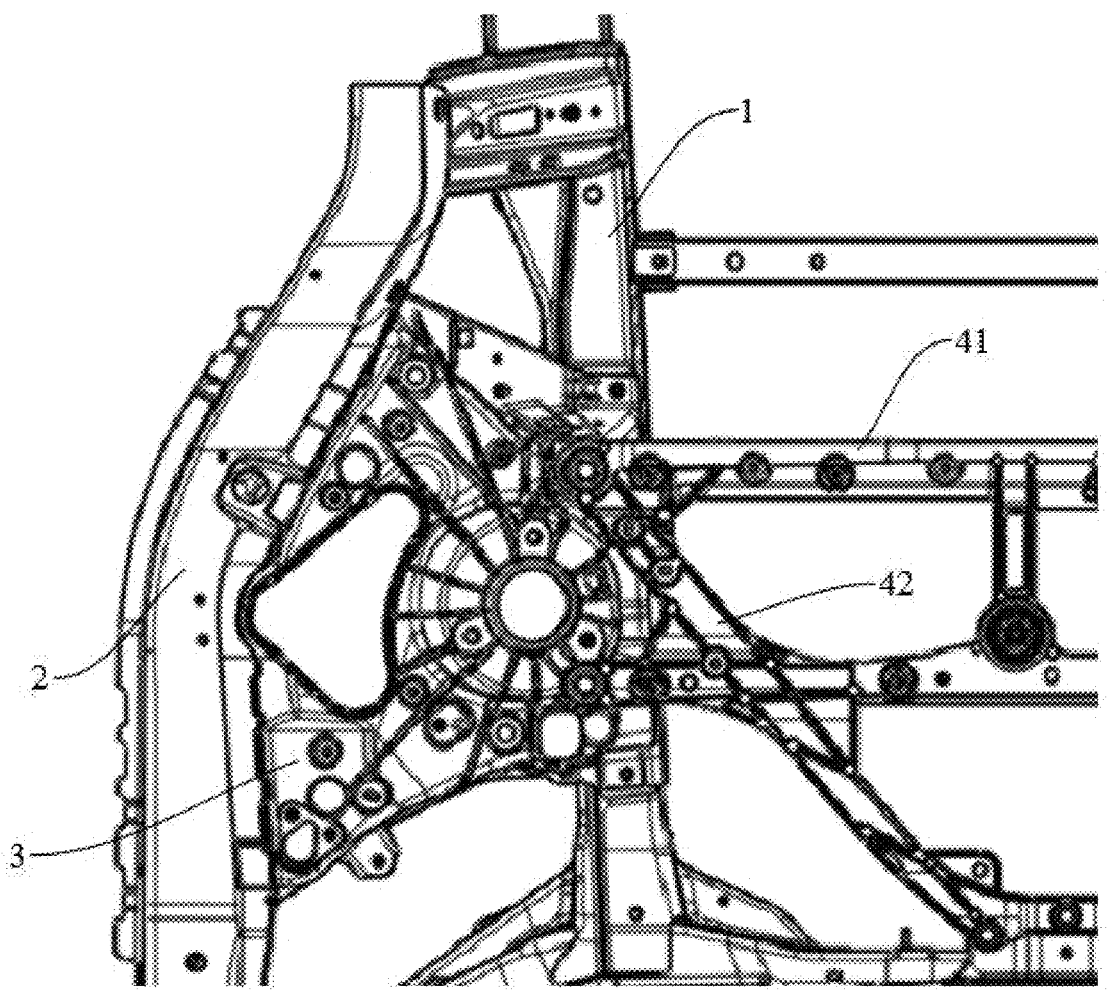
FIG. 7 is a schematic diagram of a vehicle body frame according to an embodiment of the present disclosure, without a front bumper beam assembly and an A-pillar assembly.

Specifically, as illustrated in FIG. 7, a plurality of the first coupling parts 41 is provided, and the plurality of the first coupling parts 41 is spaced apart in the front-rear direction; and a plurality of the second coupling parts 42 is provided, and the plurality of second coupling parts 42 is sequentially coupled in the front-rear direction, and the plurality of second coupling parts 42 is coupled to the plurality of first coupling parts 41 in one-to-one correspondence. By arranging the first coupling part 41 and the second coupling part 42, the impact energy on the second transverse force transmission path and the first force transmission path can be dispersed, and the impact resistance of the vehicle body frame can be further improved. By arranging the plurality of the first coupling parts 41 and the plurality of second coupling parts 42, the impact energy can be gradually dispersed and the impact energy invading the driver compartment can be reduced.

In some embodiments, the first coupling part 41 and the second coupling part 42 are integrally formed, which can improve structural strength and impact resistance of the front compartment triangular beam 4. For example, when a plurality of first coupling parts 41 and a plurality of second coupling parts 42 are provided, the plurality of second coupling parts 42 and the plurality of first coupling parts 41 are integrally formed.

In some embodiments, the vehicle body frame further includes an A-pillar assembly 6, the A-pillar assembly 6 is coupled to a side of the upper side beam 2 facing away from the front damper tower 3, and a third longitudinal force transmission path is formed between the upper side beam 2 and the A-pillar assembly 6.

Specifically, as illustrated in FIG. 1, the A-pillar assembly 6 is coupled to the rear side of the upper side beam 2. It should be noted that after the impact energy acting on the upper side beam 2 is dispersed to the front longitudinal beam 1 through the first transverse force transmission path and the second transverse force transmission path, the remaining impact energy acts on the A-pillar assembly 6 through the third longitudinal force transmission path, thus reducing the energy invading the driver compartment.

A vehicle according to embodiments of the present disclosure includes a vehicle body frame according to any one of the above embodiments.

The vehicle body frame of embodiments of the present disclosure includes: a front bumper beam assembly extending along a width direction of a vehicle body; a first frame assembly and a second frame assembly separately coupled to the front bumper beam assembly and spaced apart in the width direction of the vehicle body, and each of the first frame assembly and the second frame assembly including a front longitudinal beam, an upper side beam and a front damper tower, in which the front longitudinal beam is coupled to the front bumper beam assembly to form a first longitudinal force transmission path, the upper side beam is coupled to the front longitudinal beam, and the front damper tower has a first end coupled to the upper side beam and a second end coupled to the front longitudinal beam; and a front compartment triangular beam having a first end coupled to the front damper tower of the first frame assembly, and a second end coupled to the front damper tower of the second frame assembly.

The vehicle body frame of embodiments of the present disclosure can optimize the force transmission path of the vehicle body frame and improve the crash performance of the vehicle body frame.

In some embodiments, the upper side beam includes an upper side beam inner plate and an upper side beam outer plate, and the upper side beam outer plate and the interior of the upper side beam are fitted with each other. The vehicle body frame also includes a coupling beam having a first end coupled to the upper side beam inner plate and a second end coupled to the front longitudinal beam to form a first transverse force transmission path.

In some embodiments, the coupling beam includes a first plate body and a second plate body, and each of the first plate body and the second plate body has an upper end coupled to the upper side beam inner plate.

In some embodiments, the front longitudinal beam has a first side and a second side oppositely arranged in the width direction of the vehicle body, the first plate body has a lower end coupled to the first side, and the second plate body has a lower end coupled to the second side.

In some embodiments, the front damper tower includes a coupling edge arranged obliquely from bottom to top, and the coupling edge has a first end coupled to the upper side beam and a second end coupled to the front longitudinal beam to form a second transverse force transmission path.

In some embodiments, the front damper tower is provided with a plurality of reinforcing ribs, and the plurality of reinforcing ribs are spaced apart from each other on the front damper tower.

In some embodiments, the front compartment triangular beam includes a first coupling part and a second coupling part, and each of the first coupling part and the second coupling part is coupled to the front damper tower. The first coupling part extends along the width direction of the vehicle body, and the first coupling part is configured to couple the front damper tower of the first frame assembly to the front damper tower of the second frame assembly to form a third lateral force transmission path, and the second coupling part extends along a length direction of the vehicle body, a side of the second coupling part facing away from the front damper tower is adapted to be coupled to a front panel assembly to form a second longitudinal force transmission path.

In some embodiments, the first coupling part and the second coupling part are integrally formed.

In some embodiments, the vehicle body frame further includes an A-pillar assembly coupled to a side of the upper side beam facing away from the front damper tower, and a third longitudinal force transmission path is formed between the upper side beam and the A-pillar assembly.

The vehicle according to embodiments of the present disclosure includes a vehicle body frame according to any of the above embodiments.

In the description of the present disclosure, it should be understood that, terms such as "central", "longitudinal", "lateral", "length", "width", "thickness", "up", "down", "front", "rear", "right", "left", "horizontal", "vertical", "top", "bottom", "inner", "outer", "clockwise", "anticlockwise", "axial", "radial" and "circumferential" etc., should be construed to refer to the orientation as then described or as illustrated in the drawings under discussion. These relative terms are for convenience of description and do not require that the present disclosure be constructed or operated in a particular orientation. Therefore, it should not be construed as limiting the present invention.

In addition, terms such as "first" and "second" are used herein for purposes of description and are not intended to indicate or imply relative importance or significance or the number of the features. Therefore, the features defined with "first" and "second" can include at least one of these features explicitly or implicitly. In the description of the present disclosure, "a plurality of" means at least two, such as two, three, etc., unless otherwise specifically defined.

In the present disclosure, unless specified or limited otherwise, the terms "mounted," "connected," "supported," and "coupled" and variations thereof are used broadly, for example, For example, it can be fixedly connected, detachably connected, or integrated; can be mechanically connected, electrically connected or can communicate with each other; it can be directly connected or indirectly connected through an intermediate medium, and it can be the internal communication of two elements or the interaction between two elements, unless otherwise specified. For those skilled in the art, the specific meaning of the above terms in the present disclosure may be understood according to specific situations.

In the present disclosure, unless otherwise specified and limited, the first feature "above" or "below" the second feature may be the direct contact between the first and second features, or the indirect contact between the first and second features through an intermediate medium. Further, the first feature is "above", "on top of" and "on" the second feature, but the first feature is directly above or obliquely above the second feature, or it only means that the horizontal height of the first feature is higher than that of the second feature. The first feature "under", "below" and "on bottom of" the second feature may be the first feature directly under or obliquely under the second feature, or only indicate that the horizontal height of the first feature is smaller than that of the second feature.

In the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art can combine different embodiments or examples and features of different embodiments or examples described in this specification without contradicting each other.

Although embodiments of the present disclosure have been illustrated and described, it could be understood that the above embodiments are illustrative and should not be construed as limitations of the present invention. Changes, variations, alternatives, and modifications can be made by those skilled in the art in the embodiments within the scope of the present disclosure.

What is claimed is:

1. A vehicle body frame comprising:

a front bumper beam assembly extending along a width direction of a vehicle body;

a first frame assembly and a second frame assembly separately coupled to the front bumper beam assembly and spaced apart in the width direction of the vehicle body, each of the first frame assembly and the second frame assembly including a front longitudinal beam, an upper side beam and a front damper tower, the front longitudinal beam being coupled to the front bumper beam assembly to form a first longitudinal force transmission path, the upper side beam being coupled to the front longitudinal beam, the front damper tower having a first end coupled to the upper side beam and a second end coupled to the front longitudinal beam; and a front compartment beam having substantially triangular shape with a flat between angular sections, the front compartment beam having a first end coupled to the front damper tower of the first frame assembly and a second end coupled to the front damper tower of the second frame assembly, wherein the upper side beam comprises an upper side beam inner plate and an upper side beam outer plate, and the upper side beam outer plate and the upper side beam inner plate are fitted with each other; the vehicle body frame further comprises a coupling beam, the coupling beam having a first end coupled to the upper side beam inner plate and a second end coupled to the front longitudinal beam to form a first transverse force transmission path;

wherein the coupling beam comprises a first plate body and a second plate body, and each of the first plate body and the second plate body has an upper end coupled to the upper side beam inner plate; and wherein the first plate body is located above the second plate body, the first plate body has a lower end coupled to the front longitudinal beam, the upper end of the first plate body is coupled to a left side face of the upper side beam inner plate, and the upper end of the second plate body is coupled to a lower end face of the upper side beam, and a distance between the first plate body and the second plate body is gradually increased from top to bottom.

2. The vehicle body frame according to claim 1, wherein the front longitudinal beam has a first side and a second side oppositely arranged in the width direction of the vehicle body, the first plate body has a lower end coupled to the first side, and the second plate body has a lower end coupled to the second side.

3. The vehicle body frame according to claim 1, wherein the upper side beam extends in a length direction of the vehicle body, and the upper side beam inner plate is located below the upper beam outer plate, and the upper side beam inner plate and the upper side beam outer plate are interlocked with each other to form a cavity with a quadrangular cross section.

4. The vehicle body frame according to claim 1, wherein the front damper tower and the coupling beam are spaced apart in a length direction of the vehicle body, and a first energy-absorbing deformation area is enclosed among the front damper tower, the upper side beam, the front longitudinal beam and the coupling beam.

5. The vehicle body frame according to claim 1, wherein the front damper tower comprises a coupling edge, the coupling edge is arranged obliquely from bottom to top, and the coupling edge has a first end coupled to the upper side beam and a second end coupled to the front longitudinal beam to form a second transverse force transmission path.

6. The vehicle body frame according to claim 5, wherein the front damper tower is provided with a plurality of reinforcing ribs, and the plurality of reinforcing ribs is spaced apart from each other on the front damper tower.

7. The vehicle body frame according to claim 1, wherein the front compartment beam comprises a first coupling part and a second coupling part, each of the first coupling part and the second coupling part is coupled to the front damper tower; the first coupling part extends along the width direction of the vehicle body, and the first coupling part is configured to couple the front damper tower of the first frame assembly to the front damper tower of the second frame assembly to form a third transverse force transmission path, and the second coupling part extends along a length direction of the vehicle body, a side of the second coupling part facing away from the front damper tower is adapted to be coupled to a front panel assembly to form a second longitudinal force transmission path.

8. The vehicle body frame according to claim 7, wherein the first coupling part and the second coupling part are integrally formed.

9. The vehicle body frame according to claim 7, wherein a plurality of the first coupling parts is provided, and the plurality of the first coupling parts is spaced apart in the length direction of the vehicle body, and a plurality of the second coupling parts is provided, and the plurality of second coupling parts is sequentially coupled in the length direction of the vehicle body, and the plurality of second coupling parts is coupled to the plurality of first coupling parts in one-to-one correspondence.

10. The vehicle body frame according to claim 1, further comprising an A-pillar assembly, wherein the A-pillar assembly is coupled to a side of the upper side beam facing away from the front damper tower, and a third longitudinal force transmission path is formed between the upper side beam and the A-pillar assembly.

11. The vehicle body frame according to claim 1, wherein the front compartment beam comprises a first coupling part and a second coupling part, each of the first coupling part and the second coupling part is coupled to the front damper tower; the first coupling part extends along the width direction of the vehicle body, and the first coupling part is configured to couple the front damper tower of the first frame assembly to the front damper tower of the second frame assembly to form a third transverse force transmission path, and the second coupling part extends along a length direction of the vehicle body, a side of the second coupling part facing away from the front damper tower is adapted to be coupled to a front panel assembly to form a second longitudinal force transmission path.

12. The vehicle body frame according to claim 2, wherein the front compartment beam comprises a first coupling part and a second coupling part, each of the first coupling part and the second coupling part is coupled to the front damper tower; the first coupling part extends along the width direction of the vehicle body, and the first coupling part is configured to couple the front damper tower of the first frame assembly to the front damper tower of the second frame assembly to form a third transverse force transmission path, and the second coupling part extends along a length direction of the vehicle body, a side of the second coupling part facing away from the front damper tower is adapted to be coupled to a front panel assembly to form a second longitudinal force transmission path.

13. The vehicle body frame according to claim 3, wherein the front compartment beam comprises a first coupling part and a second coupling part, each of the first coupling part and the second coupling part is coupled to the front damper tower; the first coupling part extends along the width direction of the vehicle body, and the first coupling part is configured to couple the front damper tower of the first frame assembly to the front damper tower of the second frame assembly to form a third transverse force transmission path, and the second coupling part extends along a length direction of the vehicle body, a side of the second coupling part facing away from the front damper tower is adapted to be coupled to a front panel assembly to form a second longitudinal force transmission path.

14. The vehicle body frame according to claim 4, wherein the front compartment beam comprises a first coupling part and a second coupling part, each of the first coupling part and the second coupling part is coupled to the front damper tower; the first coupling part extends along the width direction of the vehicle body, and the first coupling part is configured to couple the front damper tower of the first frame assembly to the front damper tower of the second frame assembly to form a third transverse force transmission path, and the second coupling part extends along a length direction of the vehicle body, a side of the second coupling part facing away from the front damper tower is adapted to be coupled to a front panel assembly to form a second longitudinal force transmission path.

15. A vehicle comprising a vehicle body frame, wherein the vehicle body frame comprises:
   a front bumper beam assembly extending along a width direction of a vehicle body;
   a first frame assembly and a second frame assembly separately coupled to the front bumper beam assembly and spaced apart in the width direction of the vehicle body, each of the first frame assembly and the second frame assembly including a front longitudinal beam, an upper side beam and a front damper tower, the front longitudinal beam being coupled to the front bumper beam assembly to form a first longitudinal force transmission path, the upper side beam being coupled to the front longitudinal beam, the front damper tower having a first end coupled to the upper side beam and a second end coupled to the front longitudinal beam; and a front compartment beam having substantially triangular shape with a flat between angular sections, the front compartment beam having a first end coupled to the front damper tower of the first frame assembly and a second end coupled to the front damper tower of the second frame assembly, wherein the upper side beam comprises an upper side beam inner plate and an upper side beam outer plate, and the upper side beam outer plate and the upper side beam inner plate are fitted with each other; the vehicle body frame further comprises a coupling beam, the coupling beam having a first end coupled to the upper side beam inner plate and a second end coupled to the front longitudinal beam to form a first transverse force transmission path;

wherein the coupling beam comprises a first plate body and a second plate body, and each of the first plate body and the second plate body has an upper end coupled to the upper side beam inner plate; and wherein the first plate body is located above the second plate body, the first plate body has a lower end coupled to the front longitudinal beam, the upper end of the first plate body is coupled to a left side face of the upper side beam inner plate, and the upper end of the second plate body is coupled to a lower end face of the upper side beam, and a distance between the first plate body and the second plate body is gradually increased from top to bottom.

\* \* \* \* \*